(12) United States Patent
Ludwig et al.

(10) Patent No.: US 7,941,537 B2
(45) Date of Patent: May 10, 2011

(54) SYSTEM, METHOD, AND COMPUTER-READABLE MEDIUM FOR RESOURCE MIGRATION IN A DISTRIBUTED TELECOMMUNICATION SYSTEM

(75) Inventors: James Erwin Ludwig, Allen, TX (US); Matthew Christopher Perry, Plano, TX (US); Lawrence T. Dillard, III, McKinney, TX (US)

(73) Assignee: Genband US LLC, Plano, TX (US)

( * ) Notice: Subject to any disclaimer, the term of this patent is extended or adjusted under 35 U.S.C. 154(b) by 1488 days.

(21) Appl. No.: 11/242,152

(22) Filed: Oct. 3, 2005

(65) Prior Publication Data

US 2007/0076738 A1    Apr. 5, 2007

(51) Int. Cl.
*G06F 15/173* (2006.01)
(52) U.S. Cl. ...................................................... 709/226
(58) Field of Classification Search .................... 709/226
See application file for complete search history.

(56) References Cited

U.S. PATENT DOCUMENTS

| | | | |
|---|---|---|---|
| 6,449,641 B1 * | 9/2002 | Moiin et al. | 709/220 |
| 7,072,332 B2 * | 7/2006 | D'Souza | 370/352 |
| 2002/0156884 A1 * | 10/2002 | Bertram et al. | 709/224 |
| 2004/0199792 A1 | 10/2004 | Tan et al. | |

FOREIGN PATENT DOCUMENTS

| | | |
|---|---|---|
| EP | 1361513 A2 | 11/2003 |
| WO | WO 2007/040932 A2 | 4/2007 |

OTHER PUBLICATIONS

Communication pursuant to Article 94(3) EPC for European Application No. 06 803 506.2 (Oct. 10, 2008).
International Search Report dated Feb. 2, 2007 (PCT Application No. PCT/US2006/035656).
"SPARCcluster PDB System Service Manual," Chapter 1, pp. 1-1—1-15 (Publication Date Unknown).

* cited by examiner

*Primary Examiner* — Kenny S Lin
*Assistant Examiner* — Farhad Ali
(74) *Attorney, Agent, or Firm* — Jenkins, Wilson, Taylor & Hunt, P.A.

(57) ABSTRACT

A system, method, and computer-readable medium for resource migration in a distributed telecommunication system is provided. Respective sets of performance parameters of a first plurality of nodes disposed in a first node group and a second plurality of nodes in a second node group are collected. Service capabilities of the first node group and the second node group are evaluated based on the sets of performance parameters. One node group of the first node group and the second node group is designated as a currently preferred node group in response to evaluation of the service capabilities. The steps of collecting, evaluating, and designating are repeated a plurality of times. The currently preferred node group is designated as an active preferred node group in the event that a sequence of evaluating service capabilities each results in the one node group being designated as the currently preferred node group.

21 Claims, 6 Drawing Sheets

| | Address 230A | Node Group 230B | Online Status 230C | CPU count 230D | CPU Power 230E | Memory Consumed 230F | Memory Provisioned 230G | N/W Connections 230H | Disk Space Available 230I | Disk Space Provisioned 230J | Active Applications 230K |
|---|---|---|---|---|---|---|---|---|---|---|---|
| 220A | | | | | | | | | | | |
| 220B | | | | | | | | | | | |
| 220C | | | | | | | | | | | |
| 220D | | | | | | | | | | | |
| 220E | | | | | | | | | | | |
| 220F | | | | | | | | | | | |
| 220G | | | | | | | | | | | |

Figure 2

SYSTEM, METHOD, AND COMPUTER-READABLE MEDIUM FOR RESOURCE MIGRATION IN A DISTRIBUTED TELECOMMUNICATION SYSTEM

BACKGROUND

Telecommunications systems are increasingly sophisticated and require skilled operators for system operation, administration, and maintenance. Distributed telecommunication systems provide the ability for system administrators to logically partition telecommunication entities into groups. Each distributed group may include a plurality of system nodes. Distributed groups may provide increased reliability by way of application and operational redundancy. For example, if a node in one group is taken off-line or otherwise becomes unable to provide a particular service, a switchover may be performed to another group having a node configured to provide the service.

An operator may monitor the telecommunication system and manually align system resources to a node group evaluated as best able to perform a particular task or application. Manual alignment or configuration of system resources is time consuming and requires diligence on the part of the system operator or operators. In the event the health, or system capability, is degraded, the system may run at less than optimal performance until an evaluation that the system performance is degraded is made by a system operator and until the system is reconfigured. Such a method of system maintenance is time consuming, expensive, and prone to human error.

Deployment of redundant infrastructure in a distributed telecommunication system provides for increased reliability of telecommunication services and alleviates service outages. For example, a distributed telecommunication system having separate node groups featuring mutually redundant services located at geographically distinct locales may be able to reliably provide services during a catastrophic event, such as a natural disaster, at one of the node group locations. However, such a distributed system disadvantageously requires increased signaling among the redundant system node groups, e.g., for synchronization purposes, transmittal of internodal data among various activate applications, or for other overhead data transmission required for system operation.

SUMMARY

Accordingly, it is an object of one or more embodiments of the present invention to provide a method, system, and computer-readable medium for facilitating operation of a distributed telecommunication system. It is a further object of one or more embodiments to provide a mechanism for reducing the overhead signaling required for operation of a distributed telecommunication system. It is yet a further object of one or more embodiments to provide a mechanism for providing application switchover in a distributed telecommunication system that advantageously does not require manual alignment of system resources. It is yet a further object of one or more embodiments to provide a mechanism for application switchover in a distributed telecommunication system that provides a stabilization delay prior to designation of a node group for application switchover thereby eliminating or reducing the likelihood of rapid or frequent application switchovers resulting from fluctuations in node group capabilities that may result from environmental factors, human causes, system transient effects, or other temporary system or environmental anomalies.

BRIEF DESCRIPTION OF THE DRAWINGS

Aspects of the present disclosure are best understood from the following detailed description when read with the accompanying figures, in which:

FIG. 2 is a diagrammatic illustration of an embodiment of a database to which a fault manager may store and retrieve health parameters of various nodes in the telecommunication system depicted in FIG. 1;

DETAILED DESCRIPTION

Figure 1:
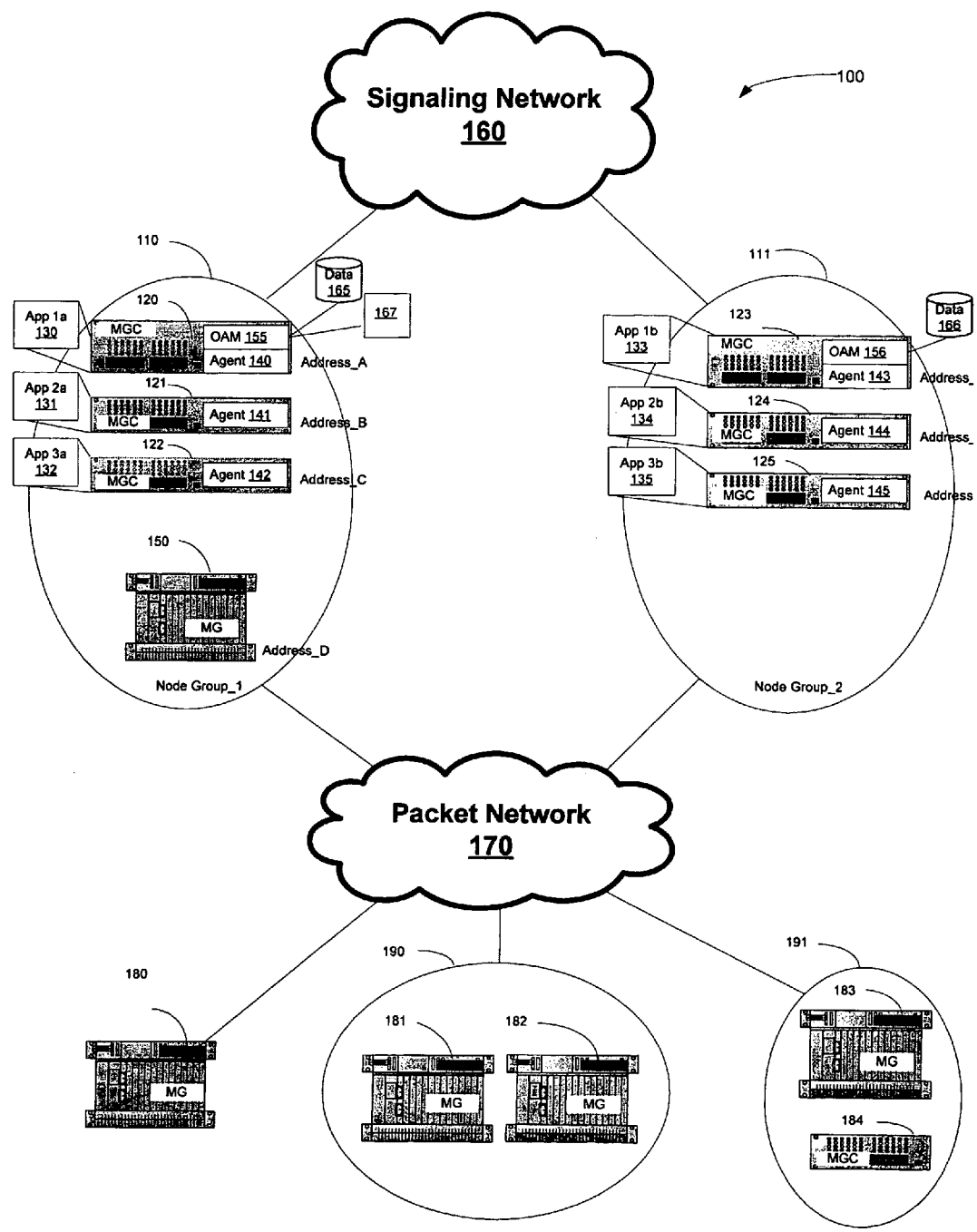
FIG. 1 is a diagrammatic representation of an embodiment of a telecommunication system in which a resource herding routine may be deployed for advantage.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagrammatic representation of an embodiment of a telecommunication system 100 in which a resource herding routine may be deployed for advantage. As referred to herein, resource herding is the migration of system resources, such as system applications, from one node group to another node group based on service capabilities of the node groups. Telecommunication system 100 may comprise various entities for provisioning and support of integrated voice and data switched services. For example, system 100 may include infrastructure for providing call control for subscriber line and trunk interfaces, time division multiplexed (TDM) and packet devices and residential and business customers. System 100 may include infrastructure for providing all aspects of voice call processing including call control, signaling and media services.

In the illustrative example, system 100 comprises a distributed telecommunication system that includes two node groups 110 and 111 (respectively designated Node Group_1 and Node Group_2). Each node group 110 and 111 may include various entities including, but not limited to, media gateways, media gateway controllers or soft switches, or other entities that provide or support the provisioning of one or more telecommunication services. Node group 110 includes media gateway controllers (MGCs) 120-122 that each run respective applications 130-132 (illustratively designated App 1a-App 3a). Additionally, node group 110 includes a media gateway (MG) 150 for provisioning of circuit switched and/or packet switched voice and data services. Each MGC 120-122 includes an agent 140-142 adapted to collect performance parameters or metrics on respective MGCs 120-122. The performance parameters collected by the agents are indicative of some measure of the respective MGCs service capabilities. In a similar manner, node group 111 includes MGCs 123-125 each adapted to run one or more respective applications 133-135 (illustratively designated App 1b-App 3b). Each of MGCs 123-125 includes a respective agent 143-145 adapted to collect performance parameters of respective MGCs 123-125. Applications 130-135 and Agents 140-145 are preferably implemented as instruction sets executable by an instruction execution system and may be implemented on a computer-readable medium.

Node groups 110 and 111 are each interconnected with a signaling network 160, such as a signaling system 7 (SS7) network, and a packet network 170, e.g., a public network such as the Internet, a private local area network, or another packet network adapted for transmission of packetized data. Packet network 170 may interface with other remote nodes, such as a remote MG 180, and/or other remote node groups, such as remote node group 190 that includes MGs 181 and 182 and remote node group 191 that includes MG 183 and MGC 184.

MGCs 120-125 and 184 may be implemented as, for example, respective TEKELEC 3000 Multimedia Gateway Controllers that support the delivery of integrated voice and data switched services on a single platform or other MGCs providing additional or lesser telecommunication services. MGCs 120-125 and 184 may provide call control for subscriber line and trunk interfaces, TDM and packet devices and residential and business customers. MGCs 120-125 and 184 may support call control models for voice services including AIN/INAP, Megaco/H.248, MGCP, and SIP, and may be deployed with a range of access networks including narrowband TDM to broadband DSL, IP, or ATM.

MGs 150 and 180-183 may be implemented as, for example, respective TEKELEC 8000 Multimedia Gateways or other suitable MGs. For example, MGs 150 and 180-183 may each simultaneously support two switching fabrics, such as a DS-0 non-blocking TDM fabric and a cell/frame fabric. Accordingly, MGs 150 and 180-183 may handle both circuit switched TDM traffic as well as packet-based voice and data traffic.

In the illustrative examples, assume applications 130-132 are redundant instances of respective applications 133-135. Accordingly, a service provided by any of applications 130-132 may also be provided by respective applications 133-135. By distributing applications 130-132 within node group 110 and applications 133-135 within node group 111, functional redundancy is provided by system 100 that may mitigate system performance loss or degradation in one of node groups 110 and 111. Applications 130-135 support active and standby operational modes. As referred to herein, a switchover refers to the functional change of an application instance in a node group from an active mode to a standby mode and a corresponding change of a redundant instance of the application from a standby mode to an active mode in another node group. Such applications are said to support switchover.

In some instances, it may be desirable to prevent an application that supports switchover from being switched to another node group. To this end, a "herdable" designation may be assigned to applications. A system administrator or other authorized personnel may selectably designate each application within a node group as herdable or non-herdable. An application designated as herdable that supports switchover may be switched between an active mode and a standby mode for application migration. An application designated as non-herdable may not be switched between an active mode and a standby mode for application migration based on a preferred node group designation made in accordance with embodiments described herein. In accordance with an embodiment, a system administrator may respectively designate each of applications 130-135 as herdable or non-herdable, and such designations may be maintained in a configuration file 167 or other data structure.

It is desirable from a system performance standpoint to have all (or as many as possible) redundant applications run from a common node group. For example, various applications run by nodes in a node group may interact with one or more other applications run by different nodes. If all active applications are run from a common node group, call set up times are advantageously reduced since application and resource communications are constrained to a common node group. Conversely, if an active application running in one node group requires data or other information from another application running in another node group, inter-node group communications, e.g., by way of packet network 170, are required and introduce additional latencies incurred during call establishment or processing. A node group that has, or is designated to have, all applications that support switchover and that are designated as herdable switched to an Active mode and run thereby is referred to herein as an Active Preferred node group.

In accordance with an embodiment, each node group 110 and 111 of system 100 includes a respective instance of an operations and maintenance (OAM) fault manager 155 and 156. Manager 155 and 156 are respective applications adapted to monitor the system "health," i.e., performance or service capabilities of respective node groups 110 and 111, and determine whether application switchover is to be performed. Fault managers 155 and 156 each may be configured in an active mode or a standby mode, support switchover, and may be designated as herdable. In general, one of managers 155 and 156 will be configured in an Active mode and the other will be configured in the Standby mode at a given time.

In general, resource herding, or intra-system application migration, is performed by a fault manager by way of a system health algorithm and a resource distribution algorithm. The system health algorithm obtains system health parameters from nodes in node groups and may be implemented as respective instances of routines or instruction sets that are run on respective nodes. Based on the health parameters, the system health algorithm is adapted to evaluate the health or service capabilities on a per-node group basis. The system health of a node group may be determined from an evaluation of various parameters of a node group, such as, but not limited to, CPU online/offline status (e.g., a count of the number of online CPUs in a node group), aggregate CPU power available (e.g., a sum of the node group processing capacity in GHz), aggregate memory consumption of a node group, aggregate memory provisioned in a node group, the number of external network connections or interfaces in a node group, disk space available and disk space provisioned in a node group, the number of online nodes in a node group, and/or other suitable parameters that provide an indication of any aspect of telecommunication service provisioning capacity.

Each node of a node group that may have health parameters collected thereon preferably includes an agent that periodically runs a health parameter collection routine for evaluating the respective node's health. Invocation of a parameter collection routine may be instigated by the agent, by the fault manager, or by another entity. Invocation of the parameter collection routine may be performed at predetermined intervals, in response to a collection command received at the node, or by another suitable mechanism. The health parameters collected at a node are transmitted, in a parameter report, to the active fault manager for evaluation of the aggregate health of the node group. Accordingly, a parameter report may include an identifier of the node group to which the node belongs or an identifier of the node, such as a network address, such that the fault manager may determine the node group from which the health parameters were collected. For example, the fault manager may maintain a record of each node's address, and the record may include a node group identification in association with each node's address. In this manner, the fault manager may resolve the node group to which a node belongs for determining the aggregate health of the node group.

To facilitate calculation of an aggregate health measure of a node group, fault managers 155 and 156 may interface with a data storage 165 and 166 that provides a data repository for storing health parameters received from the various system nodes. A fault manager may temporarily store the health parameters in the data storage for retrieval when calculating an aggregate health measure for each respective node group. Some parameters may be viewed as more important than other parameters when determining an aggregate health measure of a node group. For example, the number of online media gateway controller nodes in a node group may be more critical from a system performance standpoint than the number of active applications running in a node group. Accordingly, the system health subroutine may place more emphasis or weight on particular parameters when determining the system health of a node group.

An instance of a parameter collection routine is invoked and run by an agent 130-135 at respective nodes 120-125 at predetermined intervals, upon receipt of a command from a fault manager instance, or by another suitable mechanism. Each agent then collects performance parameters from the respective node 120-125. The collected parameters may then be transmitted from the nodes on which the parameters were collected to the node running the active instance of a fault manager. In the illustrative examples, assume fault manger 155 is the active fault manager. Accordingly, each of nodes 121-125 transmit the performance parameters collected by agents 141-145 to node 120 where the performance parameters, along with the performance parameters collected by agent 140, are stored in storage 165.

The fault manager periodically performs an evaluation of the received performance parameters to identify a Current Preferred node group. As referred to herein, a Current Preferred node group is a designation assigned to a node group based on the most recently evaluated performance parameters. The Current Preferred node group may or may not be designated as the Active Preferred node group.

FIG. 2 is a diagrammatic illustration of an embodiment of a database 200 to which a fault manager may store and retrieve health parameters of various nodes in system 100. Database 200 may comprise a plurality of records 220 and fields 230. Each record 220A-220G, or row, may have a data element written in respective fields 230A-230K. Database 200 may be maintained on storage 165 or 166, such as a disk drive or memory device, fetched therefrom by a node, such as MGC 120 or 123, and processed thereby.

Fields 230A-230K have a respective label, or identifier, that facilitates insertion, deletion, querying, or other data operations or manipulations of database 200. In the illustrative example, fields 230A-230K have respective labels of "Address", "Node Group", "Online Status", "CPU count", "CPU Power", "Memory Consumed", "Memory Provisioned", "N/W Connections", "Disk Space Available", "Disk Space Provisioned", and "Active Applications."

Assume for illustrative purposes that database 200 is maintained by fault manager 155 in storage 165. When an agent, such as agent 140, runs an instance of a health parameter collection routine, performance parameters related to the node on which the agent runs are collected by the agent. For example, agent 140 may count the number of online CPUs in MGC 120, a CPU processing capacity of the online CPUs in MGC 120, the amount of memory consumed in MGC 120, the amount of memory provisioned in MGC 120, the number of network connections provide by MGC 120 (e.g., the number of network interfaces or the number of network interface cards), an amount of disk space available to MGC 120, an amount of disk space provisioned in MGC 120, a number of active applications run by MGC 120, or other suitable parameters that may provide an indication of the health of MGC 120. When agent 140 has collected the parameters of MGC 120, a report may be generated by agent 140 that includes the collected parameters. The report is then conveyed to fault manager 155. Fault manager 155 may process the report and update database 200 to record the parameters obtained on MGC 120. For example, a record, such as record 220A of database 200, may be assigned to MGC 120. In this instance, the parameters collected by agent 140 are written to respective records of record 220A by fault manager 155 on receipt thereof. In a similar manner, parameters collected by agents 141-145 on MGCs 121-125 are transmitted to MGC 120, read by fault manager 155, and written to respective records 220B-220G.

Fault manager 155 may read an address from each parameter report received from respective MGCs 121-125 and include the node address in a record to which the parameters of respective nodes are recorded. For example, parameter reports may be transmitted as one or more packets, such as one or more user datagram protocol (UDP) packets or other suitably formatted packets, sent to fault manger 155. Fault manger 155 may read a source IP address from an IP header of the parameter report and include the address in Address field 230A of the record in which the parameters are recorded. In this manner, field 230A may function as a key field for querying and insertion of data to database 200.

Additionally, fault manger 155 may identify a node group to which a node reporting performance parameters belongs. In one embodiment, fault manager 155 may maintain or retrieve a node mapping that includes node group identifiers and corresponding node identifiers that belong to particular node group. For example, a file or other data structure that maps node identifiers to node groups may be maintained in storage 165, retrieved therefrom, and a node group identifier resolved therefrom based on a network address included in a parameter report supplied to fault manager 155. In another embodiment, a node identifier, such as a numerical identifier or node name, may explicitly be included in a parameter report. Likewise, a node group may be explicitly included in a parameter report supplied to fault manger 155. In general, fault manger 155 is adapted to identify a node group to which a node belongs and correlate node parameters to a node group.

An online status recorded in field 230C for nodes having performance parameters recorded in respective records 220A-220G may be ascertained by fault manger 155 by the receipt or lack of receipt of a performance parameter report within a predefined interval. For example, parameter reports may be scheduled to be transmitted by agents 140-145 at predefined times or intervals. Fault manager 155 may identify a node as offline and update the node's record accordingly in the event that the parameter report is not received by the fault manager within a predefined interval of the scheduled report time. In another embodiment, fault manager may individually poll MGCs 121-125 to evaluate whether the polled nodes are online or offline. Other mechanisms may be suitably implemented for fault manager 155 to determine the online status of MGCs 121-125 and MG 150.

As fault manager 155 receives parameter reports from agents 140-145, fault manager 155 populates records 220A-220G each associated with one of agents 140-145 (and thereby nodes 120-125). At a predetermined time, fault manager 155 invokes a system health algorithm to evaluate the health or service capabilities of node groups in system 100.

Figure 3:
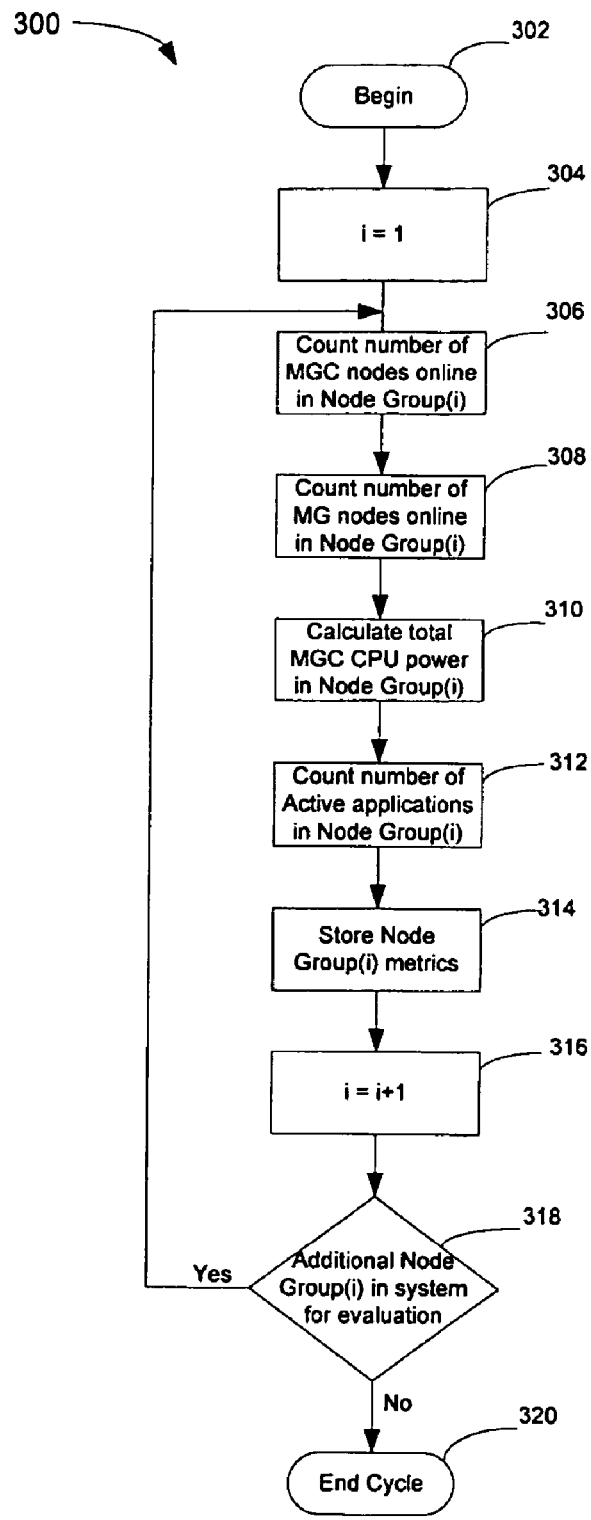
FIG. 3 is a flowchart of an embodiment of a system health routine for evaluating system health or operational capabilities on a per-node group basis.

FIG. 3 is a flowchart 300 of an embodiment of a system health routine for evaluating system health or operational capabilities on a per-node group basis. The system health routine is invoked (step 302), for example at a predetermined time or interval, and a counter, i, may be initialized, e.g., to 1 (step 304). The number of online MGC nodes in a node group i are then counted (step 306). For example, fault manger 155 may count all nodes having a node group identifier "1" in Node Group field 230B shown in FIG. 2. In a similar manner, the number of online MG nodes in the node group i are then counted (step 308). The total, or aggregate, available MGC processing capacity of the node group i is then calculated (step 310). For example, the fault manager may sum the CPU power data recorded in field 230E for each of the nodes having a node group value "1" in node group field 230B. The number of active applications in the node group i are then counted (step 312), for example by summing the number of applications identified in field 230K of records having a node group value "1" in node group 230B. The node group metrics, e.g., the number of online MGC and MG nodes in the node group i, the aggregate node group processing capacity, the number of active applications in the node group i, or other suitable node group metrics, are then stored, for example in storage 165 accessible by fault manager 155 (step 314). The counter variable i may then be incremented (step 316), and an evaluation is then made to determine if an additional node group i is available for evaluation (step 318). If an additional node group i is available for evaluation, the system health routine returns to step 306 to count the number of online MGC nodes in the node group i. If it is determined at step 318 that no additional node group i remains for evaluation, the system health routine cycle may proceed to end (step 320). In this manner, the system health routine determines various measures, such as the number of online MGC and MG nodes, the total MGC CPU power, the number of active applications, or other system parameters or metrics, for each of a plurality of node groups.

Figure 4:
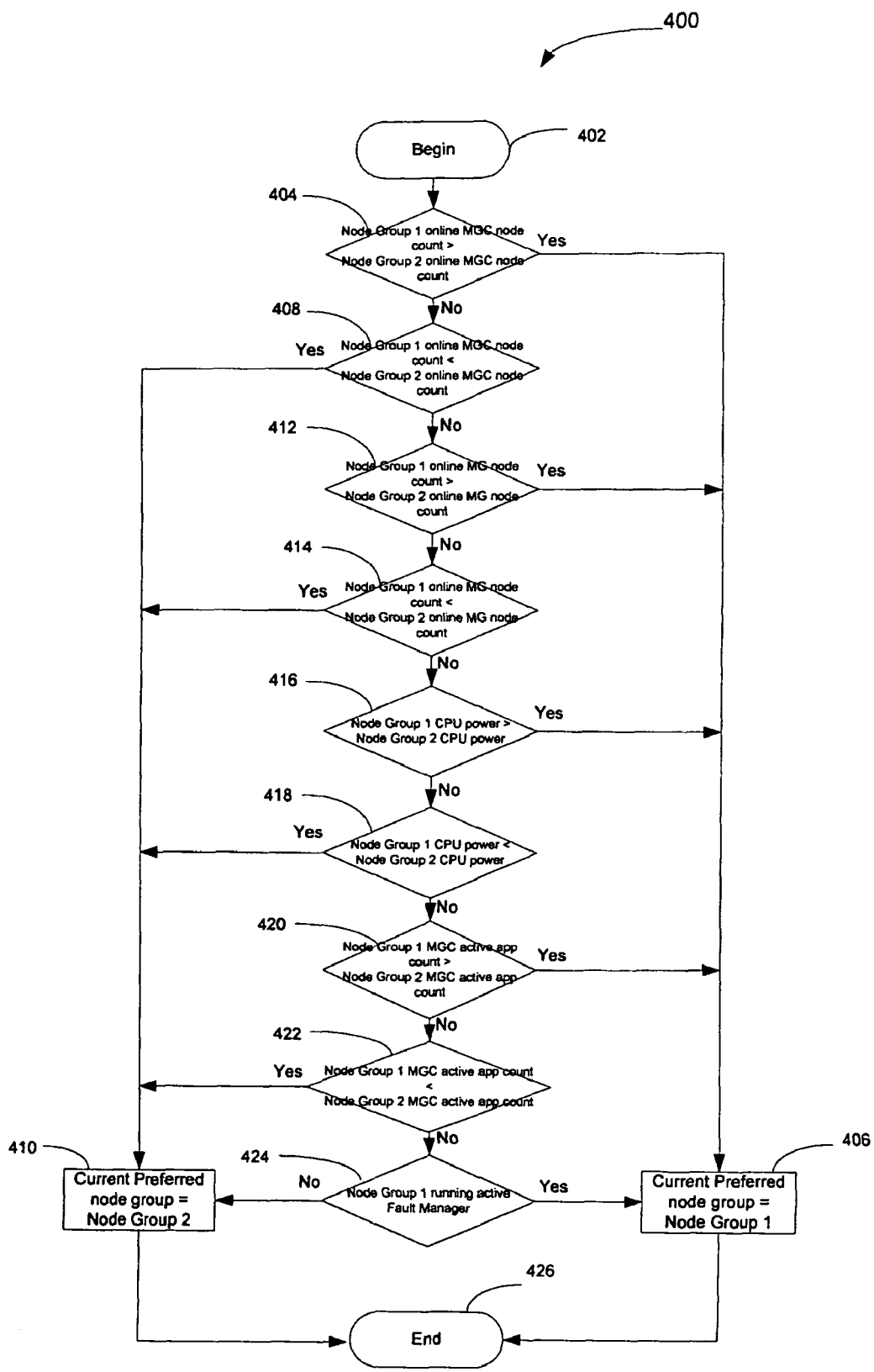
FIG. 4 is a flowchart of an embodiment of a node group selection subroutine for identifying a preferred node group based on the most recent node group metrics evaluated by the node group health subroutine described with reference to FIG. 3.

Once the node group metrics are determined, the fault manger then proceeds to identify a Current Preferred node group. FIG. 4 is a flowchart 400 of an embodiment of a node group selection subroutine for identifying a preferred node group based on the most recent node group metrics evaluated by the system health routine described with reference to FIG. 3. The node group selection subroutine is invoked (step 402), for example at a predefined time or interval, and an evaluation is made to determine if an online MGC node count of a first node group (designated Node Group 1) is greater than an online MGC node count of a second node group (designated Node Group 2) (step 404). In the event that the online MGC node count of Node Group 1 is greater than the online MGC node count of Node Group 2, a Current Preferred node group designation is set to Node Group 1 (step 406), and the node group selection subroutine cycle may then end (step 426).

If it is determined at step 404 that the online MGC node count of Node Group 1 is not greater than the online MGC node count of Node Group 2, the node group selection subroutine may then proceed to determine if the online MGC node count of Node Group 1 is less than the online MGC node count of Node Group 2 (step 408). If it is determined at step 408 that the online MGC node count of Node Group 1 is less than the online MGC node count of Node Group 2, the node group selection subroutine may then proceed to set a Current Preferred node group to Node Group 2 (step 410), and the node group selection subroutine cycle may then end according to step 426.

If it is determined at step 408 that the online MGC node count of Node Group 1 is not less than the online MGC node count of Node Group 2, the node group selection subroutine may then proceed to determine if the online MG count of node group 1 is greater than the online MG node count of Node Group 2 (step 412). In the event that the online MG node count of Node Group 1 is greater than the online MG node count of Node Group 2, a Current Preferred node group designation is set to Node Group 1 according to step 406, and the node group selection subroutine cycle may then end according to step 426.

If it is determined at step 412 that the online MG node count of Node Group 1 is not greater than the online MG node count of Node Group 2, the node group selection subroutine may then proceed to determine if the online MG node count of Node Group 1 is less than the online MG node count of Node Group 2 (step 414). If it is determined at step 414 that the online MG node count of Node Group 1 is less than the online MG node count of Node Group 2, the node group selection subroutine may then proceed to set a Current Preferred node group designation to Node Group 2 according to step 410, and the node group selection subroutine cycle may then end according to step 426.

If it is determined at step 414 that the online MG node count of Node Group 1 is not less than the online MG node count of Node Group 2, the node group selection subroutine may then proceed to determine if the processing capacity of Node Group 1 is greater than the processing capacity of Node Group 2 (step 416). In the event that the processing capacity of Node Group 1 is greater than the processing capacity of Node Group 2, a Current Preferred node group designation is set to Node Group 1 according to step 406, and the node group selection subroutine cycle may then end according to step 426.

If it is determined at step 416 that the processing capacity of Node Group 1 is not greater than the processing capacity of Node Group 2, the node group selection subroutine may then proceed to determine if the processing capacity of Node Group 1 is less than the processing capacity of Node Group 2 (step 418). If it is determined at step 418 that the processing capacity of Node Group 1 is less than the processing capacity of Node Group 2, the node group selection subroutine may then proceed to set a Current Preferred node group designation to Node Group 2 according to step 410, and the node group selection subroutine cycle may then end according to step 426.

If it is determined at step 418 that the processing capacity of Node Group 1 is not less than the processing capacity of Node Group 2, the node group selection subroutine may then proceed to determine if the MGC active application count of Node Group 1 is greater than the MGC active application count of Node Group 2 (step 420). In the event that the MGC active application count of Node Group 1 is greater than the MGC active application count of Node Group 2, a Current Preferred node group designation is set to Node Group 1 according to step 406, and the node group selection subroutine cycle may then end according to step 426.

If it is determined at step 420 that the MGC active application count of Node Group 1 is not greater than the MGC active application count of Node Group 2, the node group selection subroutine may then proceed to determine if the MGC active application count of Node Group 1 is less than the MGC active application count of Node Group 2 (step 422). If it is determined at step 422 that the MGC active application count of Node Group 1 is less than the MGC active application count of Node Group 2, the node group selection subroutine may then proceed to set the Current Preferred node group designation to Node Group 2 according to step 410, and the node group selection subroutine cycle may then end according to step 426.

If it is determined at step 422 that the MGC active application count of Node Group 1 is not less than the MGC active application count of Node Group 2, the node group selection subroutine may then proceed to determine if Node Group 1 is running the active fault manager (step 424). In the event that Node Group 1 is running the active fault manager, a Current Preferred node group designation is set to Node Group 1 according to step 406, and the node group selection subroutine cycle may then end according to step 426. If it is determined at step 424 that the Node Group 1 is not running the active fault manager, a Current Preferred node group designation is set to Node Group 2 according to step 410, and the node group selection subroutine cycle may then end according to step 426.

The exemplary node group selection subroutine described in FIG. 4 accommodates designation of a node group as a Current Preferred node group in a system having two node groups. It should be understood that the node group selection subroutine described in FIG. 4 may be extended to accommodate any number of node groups, and the particular implementation shown is illustrative only and is shown to facilitate an understanding of the invention. Moreover, other node group metric(s) used for selection of a Current Preferred node group may be substituted for one or more of those shown, or may be used in conjunction with or in addition to the node group metrics shown.

The Current Preferred node group designation provides a mechanism for specifying a node group that may be potentially designated as an Active Preferred node group for switchover of applications that are in an active mode in other node groups, that support switchover, and that are designated as herdable. However, due to various anomalies or system performance fluctuations that may occur in system 100, various performance parameters of a given node group may fluctuate in response to various factors, such as environmental factors, responses to transient phenomena that may only temporarily effect the node group, or other conditions or events that may briefly effect the processing capabilities of the node group. Accordingly, it is desirable to avoid designation of a node group as an Active Preferred node group for switchover of applications thereto in response to parameters that may rapidly fluctuate or that may only provide a temporary indication of a node group's service capabilities.

Figure 5:
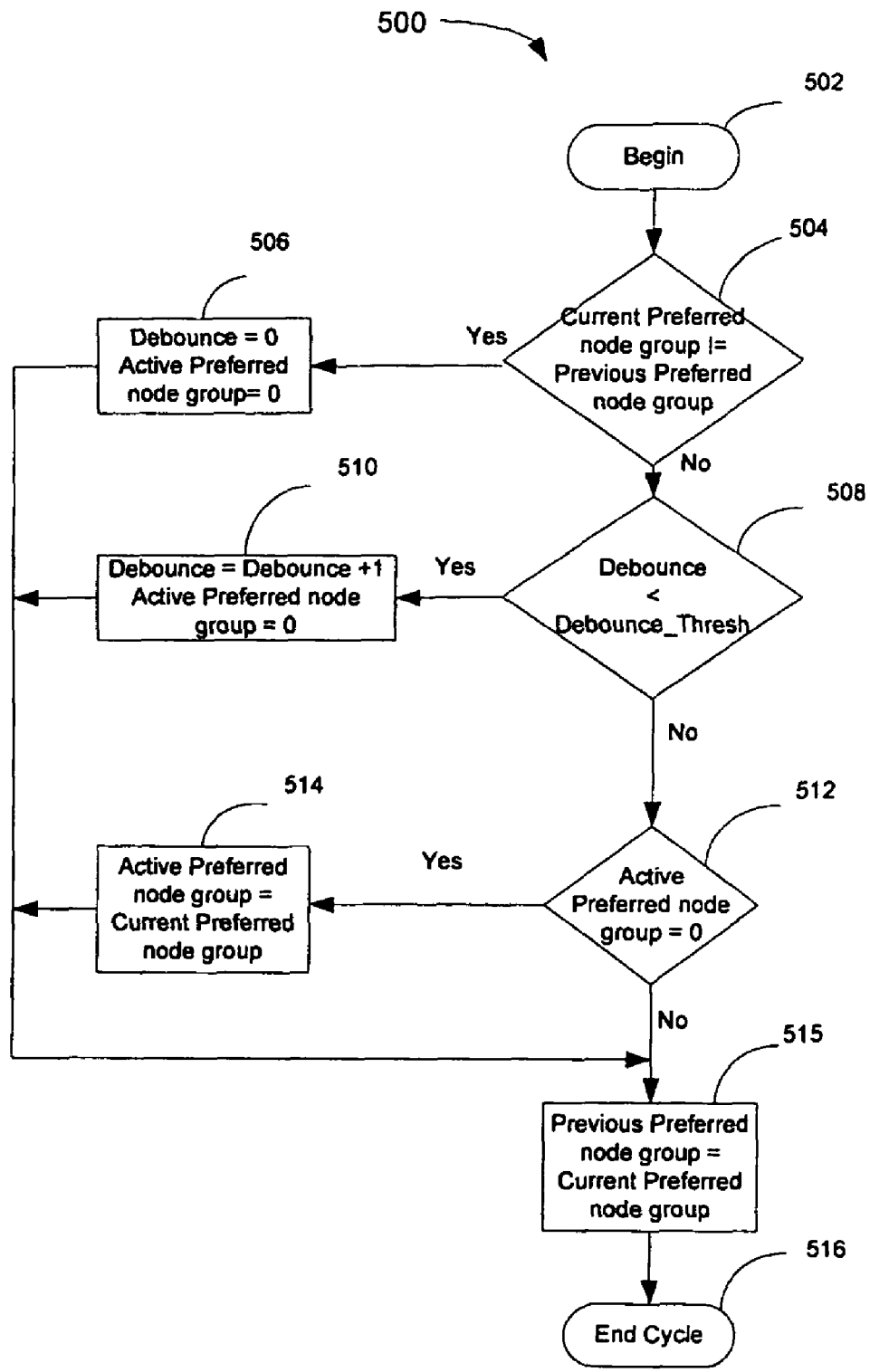
FIG. 5 is a flowchart of an embodiment of a debounce subroutine that alleviates application switchovers that may result from temporary system events or conditions.

FIG. 5 is a flowchart 500 of an embodiment of a debounce subroutine that alleviates application switchovers from temporary system events or conditions. Debounce subroutine 500 advantageously reduces the likelihood of rapid or frequent application switchovers from one node group to another node group that may result from fluctuations in node group capabilities such as environmental factors, human causes, system transient effects, or other temporary system or environmental anomalies.

The debouncing subroutine is invoked (step 502), and an evaluation is made to determine if the Current Preferred node group is different than a node group designated as a Previous Preferred node group (step 504). On an initial cycle run of debounce subroutine 500, the Previous Preferred node group designation may be null or otherwise indicate that no node group has been designated as the Previous Preferred node group. If the Current Preferred node group is determined to be different than the Previous Preferred node group, a variable Debounce is set to 0, and a variable Active Preferred node group is set to "0" or otherwise nulled (step 506). The variable Debounce provides a stabilization delay that must lapse prior to setting a node group as the Active Preferred node group for application switchover thereto. Assignment of a value of "0" to the Active Preferred node group designation indicates that no node group is currently designated as the Active Preferred node group and thus no application switchover is currently to be performed in system 100 based on a preferred status of a node group. It should be understood that switchover may still be made on an application basis, for example switchover of an application from one node group to another node group in response to failure of a node. The debounce subroutine then sets a Previous Preferred node group designation as the Current Preferred node group designation (step 515), and the debounce subroutine cycle may then end (step 516).

Returning again to step 504, in the event that it is determined that the Current Preferred node group is not different than the Previous Preferred node group, an evaluation is made to determine if the debounce variable Debounce is less than a debounce threshold Debounce_Thresh (step 508). If it is determined at step 508 that the Debounce variable is less than the threshold Debounce_Thresh, the debounce subroutine may proceed to increment the debounce variable Debounce, and set the Active Preferred node group variable to 0 (step 510). The debounce subroutine cycle may then proceed to set the Previous Preferred node group designation as the Current Preferred node group designation according to step 515.

Returning again to step 508, in the event that the variable Debounce is not less than the threshold Debounce_Thresh, the debounce subroutine may then evaluate whether the Active Preferred node group designation is set to 0 (step 512). In the event that the Active Preferred node group designation is set to 0, the debounce subroutine may proceed to set the Active Preferred node group to the Current Preferred node group (step 514), and the debounce subroutine cycle may proceed to set the Previous Preferred node group designation to the Current Preferred node group according to step 515. In the event that it is determined that the Active Preferred node group designation is not set to 0 at step 512, the debounce subroutine cycle may set the Previous Preferred node group designation to the Current Preferred node group according to step 515. Thus, the debounce subroutine provides a stabilization delay that must lapse prior to setting the Current Preferred node group as the Active Preferred node group for application switchover thereto. Particularly, the debounce routine must run a number (equal to the Debounce_Thresh) of consecutive cycles with the same node group evaluated as the Current Preferred node group in order for the Current Preferred node group to be set to the Active Preferred node group for application switchover thereto. The debounce routine advantageously reduces the likelihood of rapid or frequent application switchovers from one node group to another node group that may result from fluctuations in node group capabilities, such as environmental factors, human causes, system transient effects, or other temporary system or environmental anomalies.

Figure 6:
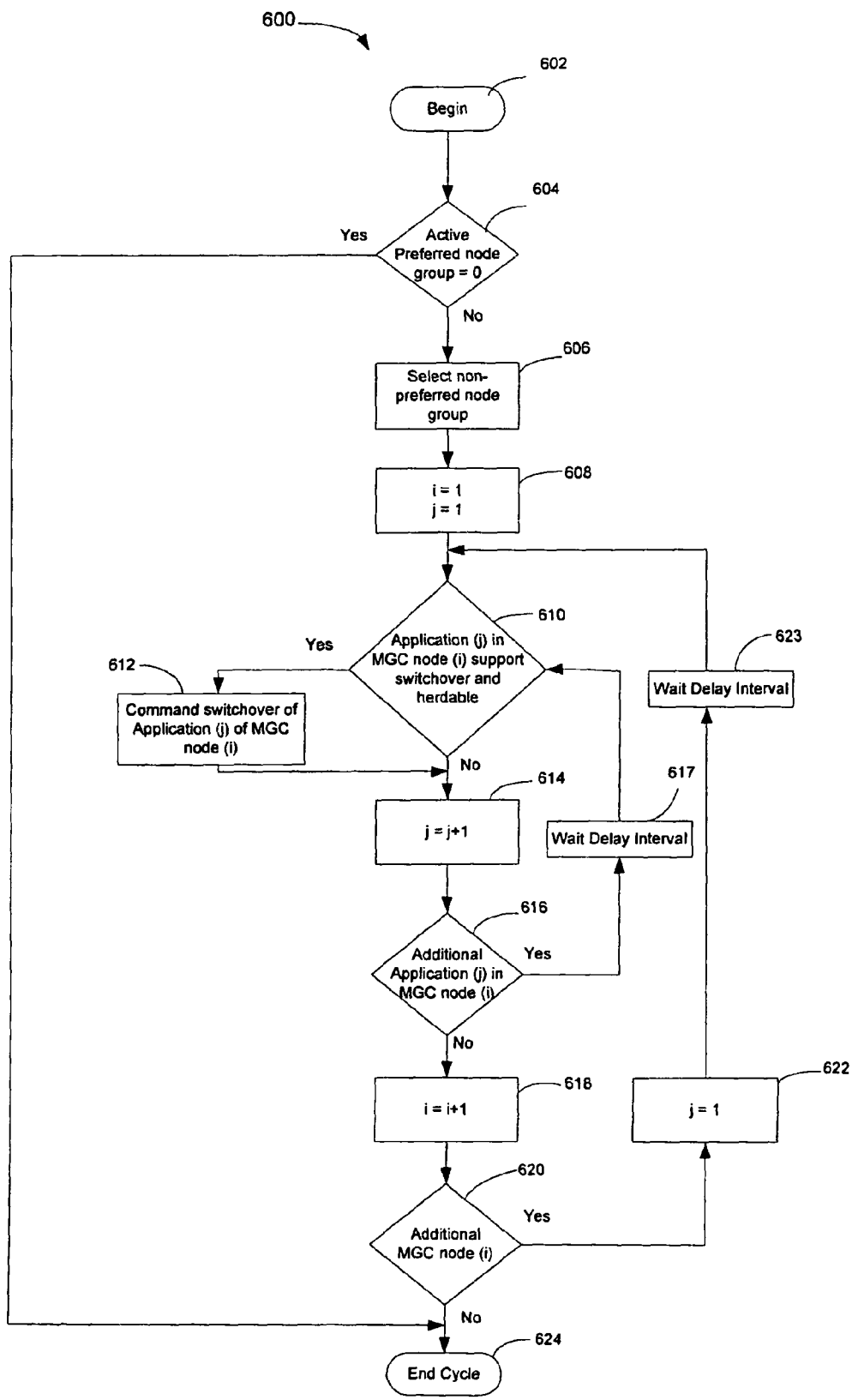
FIG. 6 is a flowchart of an embodiment of a resource distribution subroutine for migrating active applications from non-preferred node groups to a node group designated as the Active Preferred node group.

FIG. 6 is a flowchart 600 of an embodiment of a herding subroutine for migrating resources from non-preferred node groups to a node group designated as the Active Preferred node group. The herding subroutine is invoked (step 602), and an evaluation is made to determine if the Active Preferred node group designation is set to zero, that is if no node group is designated as the Active Preferred node group (step 604). In the event that the Active Preferred node group designation is zero, no application herding is currently to be performed and the herding subroutine cycle may then exit (step 624). If the Active Preferred node group is not set to zero, the herding subroutine may then select a non-preferred node group for herding applications to the Active Preferred node group (step 606). The herding subroutine may then initialize an MGC node index counter i to 1 and an application index j to 1 (step 608). An evaluation may then be made to determine if an application j in MGC node i supports switchover and is designated as herdable (step 610). If the application j does not support switchover or is not designated as herdable, the herding subroutine may proceed to increment the application index j (step 614). If it is determined that the application j in MGC node i is determined to support switchover and is designated as herdable at step 610, the herding subroutine may invoke a switchover command to switch the application j to the preferred node group (step 612). The herding subroutine may then proceed to increment the application index j according to step 614.

After the application index j is incremented at step 614, an evaluation may be made to determine if an additional application remains on MGC node i for herding evaluation (step 616). If an additional application j remains on MGC node i for herding evaluation, the herding subroutine may invoke a delay period to allow the system time to stabilize after the previous application switchover (step 617). The delay time may comprise a pre-defined interval, such as a 30 second interval or another suitable duration. After expiration of the delay interval, the herding subroutine may return to evaluate the application j for its switchover capability and herding designation according to step 610. If it is determined at step 616 that no additional application remains on MGC node i for herding evaluation, the herding subroutine may then increment the MGC node index i (step 618), and evaluate whether an additional MGC node i remains in the non-preferred node group for herding evaluation (step 620). If an additional MGC node i remains for herding evaluation, the application index j is reset to 1 (step 622), the herding subroutine may idle for a delay interval (step 623), and the herding subroutine returns to evaluate whether the application j in MGC node i supports switchover and is designated as herdable according to step 610. If it is determined that no additional MGC nodes remain in the non-preferred node group for herding evaluation at step 620, the herding subroutine cycle may then end (step 624).

As described, embodiments disclosed herein provide mechanisms for collecting parameters from respective nodes in a distributed telecommunication system. The telecommunication system includes node groups that may each include a plurality of nodes. Each of the nodes may run one or more applications that provide, facilitate provisioning, or facilitate servicing or maintenance of telecommunication services. The collected parameters provide a measure of the health, or service capabilities, of the respective nodes from which the parameters were collected. Parameters collected from nodes of the distributed telecommunication system are then conveyed to a fault manager. The fault manager runs a system health algorithm that evaluates the system health on a node group basis. The fault manager may identify a Current Preferred node group that is evaluated as having greater service capabilities than other node groups based on the most recent node group system health evaluations. A Debounce threshold provides a stabilization delay that must lapse prior to setting the Current Preferred node group as the Active Preferred node group for application switchover thereto. A debounce routine must run a plurality of consecutive cycles with the same node group evaluated as the Current Preferred node group in order for the Current Preferred node group to be set to the Active Preferred node group for application switchover thereto. Accordingly, the debounce routine advantageously reduces the likelihood of rapid or frequent application switchovers from one node group to another node group that may result from fluctuations in node group capabilities, such as environmental factors, human causes, system transient effects, or other temporary system or environmental anomalies. When a node group designated as the Current Preferred node group is subsequently designated as the Active Preferred node group, a resource distribution routine may begin commanding switchover of applications from non-preferred node groups to the Active Preferred node group.

The various functions, processes, methods, and operations performed or executed by the system can be implemented as programs that are executable on various types of processors, controllers, central processing units, microprocessors, digital signal processors, state machines, programmable logic arrays, and the like. The programs may be stored on a computer-readable medium for use by or in connection with a computer system or method. A computer-readable medium may be implemented as, for example, an electronic, magnetic, optical, or other physical device or means that can store a computer program for use by or in connection with a computer, system, method, process, or procedure. Programs may be embodied in a non-transitory computer-readable medium for use by or in connection with an instruction execution system, device, component, element, or apparatus, such as a system based on a computer or processor, or other system that can fetch instructions from an instruction memory or storage of any one or more suitable types. A computer-readable medium may be implemented as any structure, device, component, product, or other means that can store, communicate, or transport the program for use by or in connection with the instruction execution system, apparatus, or device.

The flowcharts provided herein depict process serialization to facilitate an understanding of the invention and are not necessarily indicative of the serialization of the operations being performed. The illustrative block diagrams and flow charts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, and the like.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A method of allocating resources in a distributed telecommunication system, comprising:
collecting respective sets of performance parameters of a first plurality of nodes disposed in a first node group and a second plurality of nodes in a second node group, wherein the first node group and the second node group include telecommunications nodes configured to provide at least one of voice call processing services and integrated voice- and data-switched services, wherein the voice call processing services include at least one of call control, signaling, and media services;
evaluating service capabilities of the first node group and the second node group based on the sets of performance parameters;
responsive to evaluating the service capabilities, designating one node group of the first node group and the second node group as a currently preferred node group;
repeating the steps of collecting, evaluating, and designating a plurality of times;
designating the currently preferred node group as an active preferred node group in the event that a sequence of evaluating service capabilities results in the one node group being designated as the currently preferred node group, wherein evaluating service capabilities comprises evaluating a prioritized attribute list of respective measures for the first node group and the second node group, wherein the respective measures for the first node group and the second node group include at least one of a count of online media gateway controllers, a count of online media gateways, a measure of aggregate central processing unit power, and a count of active applications; and
selectively designating a first subset of the applications within the first and second node groups as herdable and a second subset of the applications within the first and second node groups as non-herdable, wherein an application designated as herdable can be switched between an active mode and a standby mode for application migration and wherein an application designated as non-herdable cannot be switched between the active mode and the standby mode for application migration, and wherein the designation for each subset of applications is stored in a data structure.

2. The method of claim 1, further comprising invoking a first switchover command of a first application that is in an active mode running on a node in a non-preferred node group.

3. The method of claim 2, further comprising responsive to invoking the switchover command, placing an instance of the application running on the node in the non-preferred node group in a stand-by mode and placing a second instance of the application running on a node in the active preferred node group in an active mode.

4. The method of claim 2, responsive to invoking the first switchover command, invoking a second switchover command of a second application that is in an active mode running on a node in a non-preferred node group, wherein invocation of the second switchover command is performed at a predefined interval after invocation of the first switchover command.

5. The method of claim 1, further comprising:
determining that the one node group was designated as the currently preferred node group in sequential steps of designating one node group of the first node group and the second node group as the currently preferred node group; and
comparing a counter variable with a threshold.

6. The method of claim 5, further comprising:
determining whether the counter variable is less than the threshold; and
incrementing the counter variable in response to the counter variable being less than the threshold.

7. The method of claim 5, further comprising determining the counter variable is equal to the threshold, wherein designating the currently preferred node group as the active preferred node group is performed responsive to determining the counter variable is equal to the threshold.

8. A non-transitory computer-readable medium having computer-executable instructions for execution by a processing system, the computer-executable instructions for allocating resources in a distributed telecommunication system, comprising:
instructions that receive sets of performance parameters of a first plurality of nodes disposed in a first node group and a second plurality of nodes disposed in a second node group, wherein the first node group and the second node group include telecommunications nodes configured to provide at least one of voice call processing services and integrated voice- and data- switched services, wherein the voice call processing services include at least one of call control, signaling, and media services;
instructions that evaluate service capabilities of the first node group and the second node group based on the sets of performance parameters;
instructions that, responsive to evaluation of the service capabilities, designate one node group of the first node group and the second node group as a currently preferred node group;
instructions that repeat the steps of receiving, evaluating, and designating a plurality of times; and
instructions that designate the currently preferred node group as an active preferred node group in the event that a sequence of evaluating service capabilities results in the one node group being designated as the currently preferred node group, wherein evaluating service capabilities comprises evaluating a prioritized attribute list of respective measures for the first node group and the second node group, wherein the respective measures for the first node group and the second node group include at least one of a count of online media gateway controllers, a count of online media gateways, a measure of aggregate central processing unit power, and a count of active applications; and
instructions that selectively designate a first subset of the applications within the first and second node groups as herdable and a second subset of the applications within the first and second node groups as non-herdable, wherein an application designated as herdable can be switched between an active mode and a standby mode for application migration and wherein an application designated as non-herdable cannot be switched between the active mode and the standby mode for application migration, and wherein the designation for each subset of applications is stored in a data structure.

9. The non-transitory computer-readable medium of claim 8, further comprising: instructions that determine the currently preferred node group was not previously designated as the currently preferred node group; instructions that set a counter variable to zero; and instructions that designate the currently preferred node group as a previous preferred node group.

10. The non-transitory computer-readable medium of claim 8, further comprising: instructions that determine the currently preferred node group was previously designated as the currently preferred node group; and instructions that compare a counter variable to a threshold.

11. The non-transitory computer-readable medium of claim 10, further comprising instructions that increment the counter variable responsive to determining the counter variable is less than the threshold.

12. The non-transitory computer-readable medium of claim 10, wherein the instructions that designate the currently preferred node group as an active preferred node group are invoked in response to the instructions that compare the counter variable to the threshold determining the counter variable equals the threshold.

13. The non-transitory computer-readable medium of claim 8, further comprising instructions that invoke a first switchover command of a first application that is in an active mode running on a node in a non-preferred node group.

14. The non-transitory computer-readable medium of claim 13, further comprising instructions that, responsive to the switchover command being invoked, place an instance of the application running on the node in the non-preferred node group in a stand-by mode and place a second instance of the application running on a node in the active preferred node group in an active mode.

15. The non-transitory computer-readable medium of claim 13, further comprising instructions that, responsive to the first switchover command being invoked, invoke a second switchover command of a second application that is in an active mode running on a node in a non-preferred node group, wherein invocation of the second switchover command is performed at a pre-defined interval after invocation of the first switchover command.

16. A distributed telecommunication system, comprising:
a first node group comprising a plurality of nodes;
a second node group comprising a plurality of nodes, wherein the first node group and the second node group include telecommunications nodes configured to provide at least one of voice call processing services and integrated voice- and data-switched services, wherein the voice call processing services include at least one of call control, signaling, and media services; and
a fault manager adapted to:
   receive respective sets of performance parameters of the plurality of nodes of the first node group and the plurality of nodes of the second node group
   evaluate service capabilities of the first node group and the second node group based on the sets of performance parameters;
   responsive to evaluating the service capabilities, designate one node group of the first node group and the second node group as the currently preferred node group,
   repeat the steps of receiving, evaluating, and designating a plurality of times,
   designate the currently preferred node group as an active preferred node group in the event that a sequence of evaluating service capabilities results in the one node group being designated as the currently preferred node group, wherein evaluating service capabilities comprises evaluating a prioritized attribute list of respective measures for the first node group and the second node group, wherein the respective measures for the first node group and the second node group include at least one of a count of online media gateway controllers, a count of online media gateways, a measure of aggregate central processing unit power, and a count of active applications, and
   selectively designate a first subset of the applications within the first and second node groups as herdable and a second subset of the applications within the first and second node groups as non-herdable, wherein an application designated as herdable can be switched between an active mode and a standby mode for application migration and wherein an application designated as non-herdable cannot be switched between the active mode and the standby mode for application migration, and wherein the designation for each subset of applications is stored in a data structure.

17. The system of claim 16, wherein the fault manager invokes a sequence of application switchovers of at least a portion of the plurality of application instances from a non-preferred node group to a currently preferred node group, wherein a stabilization delay is included between subsequent application switchovers.

18. The system of claim 16, wherein each of the plurality of nodes in the first node group and each of the plurality of nodes in the second node group run respective instances of agents, and wherein each agent is adapted to collect performance parameters of the node on which the agent runs.

19. The system of claim 18, wherein each agent is adapted to transmit the performance parameters collected thereby to the fault manager.

20. The system of claim 16, wherein each of the plurality of nodes comprises one of a media gateway controller and a media gateway.

21. The system of claim 16, wherein the fault manager is disposed on one of the plurality of nodes of the first node group or one of the nodes of the second node group.

* * * * *